Patented Oct. 11, 1949

2,484,205

UNITED STATES PATENT OFFICE 2,484,205

APPARATUS FOR TREATING CRUDE OIL EMULSIONS

Arthur V. B. Candler, Tulsa, Okla., assignor to Maloney-Crawford Tank & Manufacturing Co., Tulsa, Okla., a corporation of Delaware Application December 21, 1944, Serial No. 569,190

18 Claims. (Cl. 183—2.7)

My invention relates to an apparatus for treating crude oil emulsions containing an emulsion, to break the emulsion and free the oil, and also for separating out the water and gas in the mixture.

Important objects of my invention are to provide apparatus of the above mentioned character which is continuous and efficient in operation, which has been found to break tight petroleum emulsions without the aid of interposed filters, which will first separate the free water and gas from the emulsion and then treat the emulsion to break the same to free the oil which is subjected to a washing action to remove impurities, which will subject the oil vapors to a treatment for separating the dry gas and liquid content therefrom, which will cause the emulsion to be continuously circulated in a body of water while being subjected to the action of heat and a retarding and rubbing action for breaking the tight emulsion, which will maintain substantially constant the level of the liquids being treated, which will preheat the incoming petroleum emulsion by the heat from the outgoing pure treated oil, and which has its several parts correlated for employing the action of heat, gravity, centrifugal force, gas expansion, condensation, reduction of velocity and surface contact in its operation.

Other objects and advantages of the invention will be apparent during the course of the following description.

In the accompanying drawings, forming a part of this application and in which like numerals are employed to designate like parts throughout the same.

In the drawings, wherein for the purpose of illustration is shown a preferred embodiment of my invention, the numeral 20 designates a vertical casing or tank, which is preferably cylindrical and closed at its top and bottom by heads 21 and 22. Means are provided for forming within the tank 20 a gas separating chamber 23, a knock-out chamber 24, a settling chamber 25, a scrubbing and treating chamber 26, and a heating and bottom accumulator chamber 27. These various chambers are arranged in end-to-end superposed relation, as shown. The casing 20 is equipped with tube gauges 27', indicating the level of the liquids in the several chambers.

The gas separating chamber 23 has a horizontal plate or bottom 28, which is perforated, in a manner to be described. Arranged beneath the horizontal plate or bottom 28 is a plate or bottom 29, which is imperforate. The plate 29 is slightly conical and is spaced from the plate 28 to form a sump chamber 30. Large open ended vertical tubes or cylinders 31 extend through this sump chamber 30 and have no communication therewith and also pass through openings formed in the plates 28 and 29. Each tube or cylinder 31 extends above the plate 28 for a substantial distance and is provided in its upper end with elongated vertical openings 32, as shown. Vertical gas outlet pipes 33 extend through the large tubes or cylinders 31, in concentric relation thereto and are much smaller diameter than these tubes or cylinders 31, providing annular passages within the tubes. The pipes 33 project above the tubes or cylinders 31, as shown, and the pipes 33 are open ended. The top of each tube or cylinder 31 is covered by a horizontal circular plate 34, rigidly attached thereto, and extending radially beyond the same. There are preferably four of the openings 32 disposed ninety degrees apart, as shown. Disposed outwardly of each opening 32 and arranged to cover the same is a wing or vane 38, suitably attached to the tube or cylinder 31 and extending circumferentially thereof. This vane covers the opening 32 and has a curved closed end 39 while its opposite end is open. Surrounding the tube or cylinder 31 and wings 38 is an annular group of vertical channels 40, spaced from the wings 38, and in concentric relation to tube 31. These vertical channels are rigidly attached to the bottom 28 and the plate 34. Passages of the channels 40 face inwardly and the plate 28 is provided with an annular set of apertures 41 which lead into the passages of the channels. Arranged upon the plate 28 are domes 42. Each dome 42 surrounds one tube or cylinder 31 and annular group of channels 40. Each dome 42 is circular in cross-section, preferably tapers upwardly and has an imperforate top 43, while the dome has its periphery perforated, as shown at 44, throughout its entire area. These perforations 44 are punched and swaged inwardly. The bottom of the dome contacts with the plate 28 and is rigidly secured thereto and the dome is provided at its bottom with elongated vertical openings 45. The plate 28 is provided with radial groups of openings 46 and groups of openings 47, at the outer ends of the radial groups 46, as shown.

The knock-out chamber 24 has its top formed by the plate 29 and this chamber has an imperforate bottom 48, which is conical and decreases in diameter downwardly. Leading into the sump chamber 30 are vertical drain pipes 49 which extend through and beyond the knock-out chamber 24 and have no communication therewith. The pipes 49 have their lower ends leading into the chamber 25 near its bottom and well below the liquid level of the same to form a liquid seal. The vapor outlet pipes 33 also extend through the knock-out chamber 24 but have no communication therewith. The numeral 50 designates an emulsion inlet diverting box or nozzle, arranged within and at the periphery of the chamber 24 and generally equidistantly spaced from the top and bottom of the chamber 24, and well below the fluid level within this chamber. The diverting box 50 extends circumferentially of the chamber 24 at its periphery and will cause the influent to travel at a tangent to or circumferentially of the periphery on the chamber 24. The incoming emulsion is supplied to the box from a pipe 51. The numeral 52 designates a receiver box connected with a vertical down pipe or flume 53 which extends down into the chamber 27.

The scrubbing and treating chamber 26 may be regarded as extending from the bottom 54 to horizontal segmental partitions 55, each of which extends for ninety degrees. These segmental partitions 55 are spaced for ninety degrees affording open vertical channels or passages 56, between them. The inner sides of these channels 56 are covered by depending aprons 57, curved in horizontal cross-section and arranged at the inner edges of the segmental partitions 55 and extending for ninety degrees each.

Figure 1:
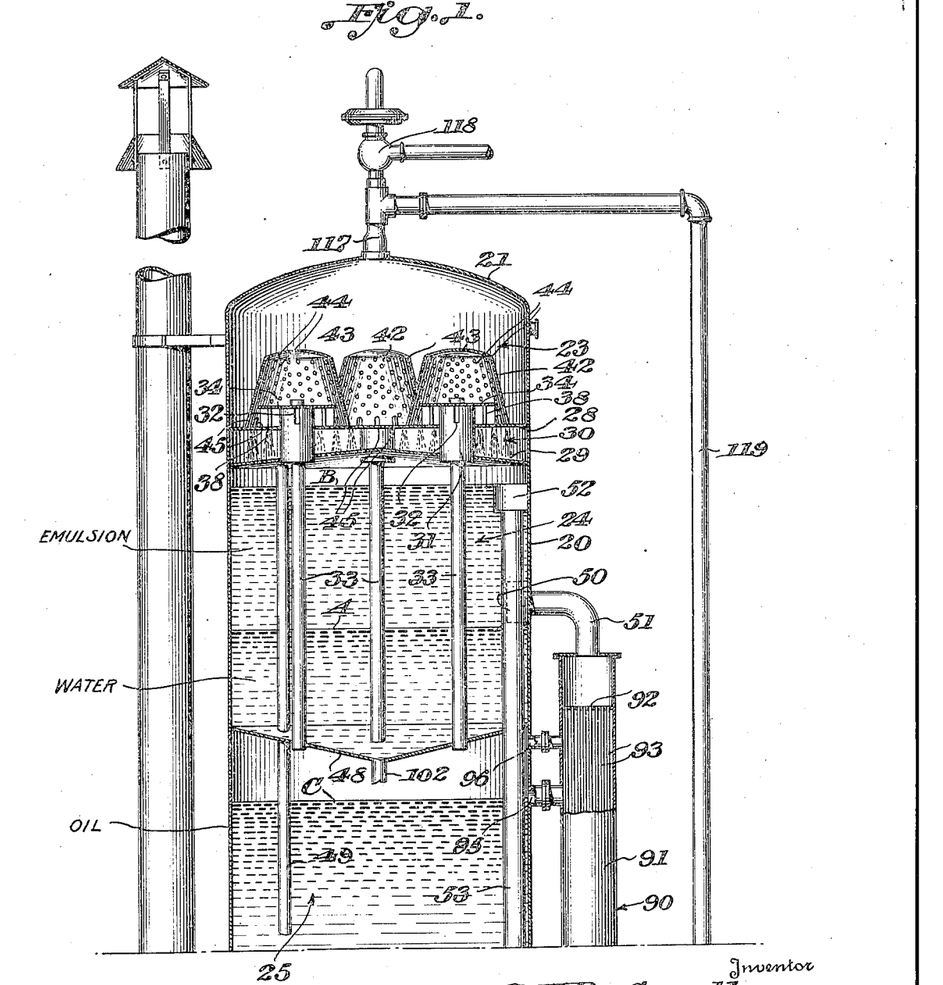
Figure 1 is a central vertical section through the upper half of the apparatus embodying my invention, Figure 1ª is a similar view through the lower half of the apparatus.
Figure 1A:
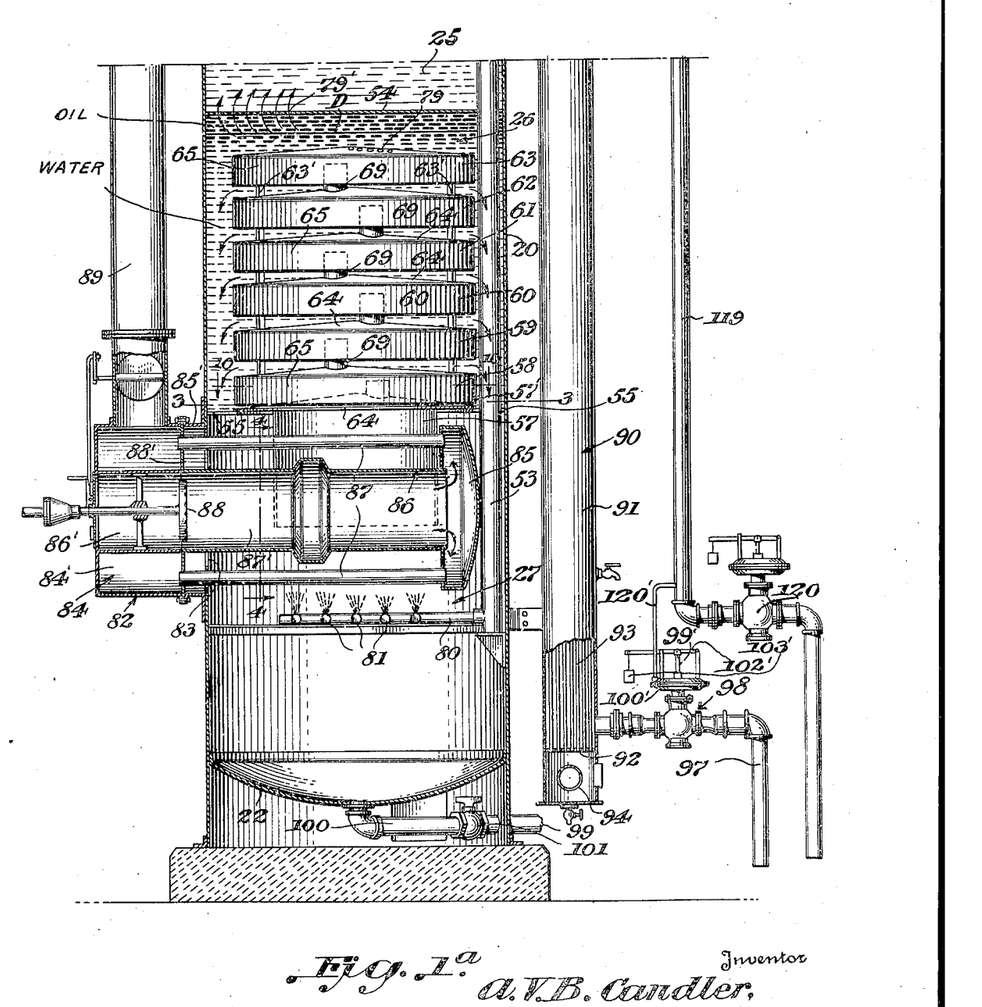
Figures 2, 3, 4:
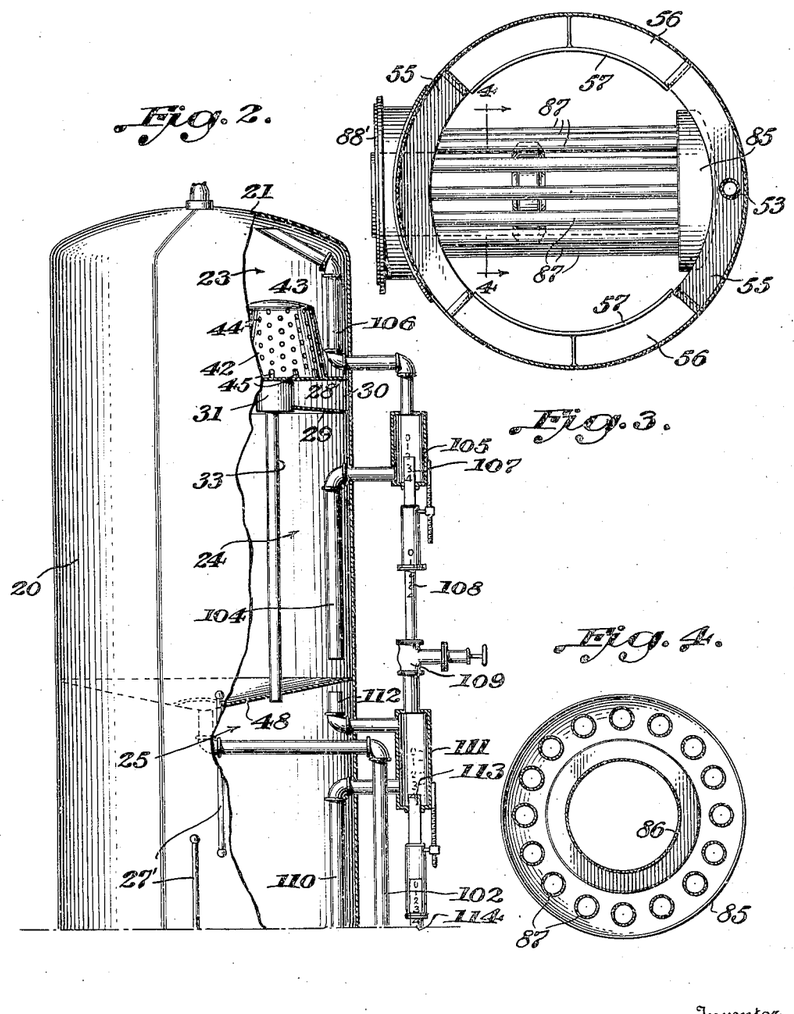
Figure 2 is a side elevation, parts in section of the upper half of the apparatus, Figure 2ª is a similar view of the lower half of the same.
Figure 3 is a horizontal section taken on line 3—3 of Figure 1ª.
Figure 4 is a transverse section taken on line 4—4 of Figure 3.
Figures 2A, 16, 17:
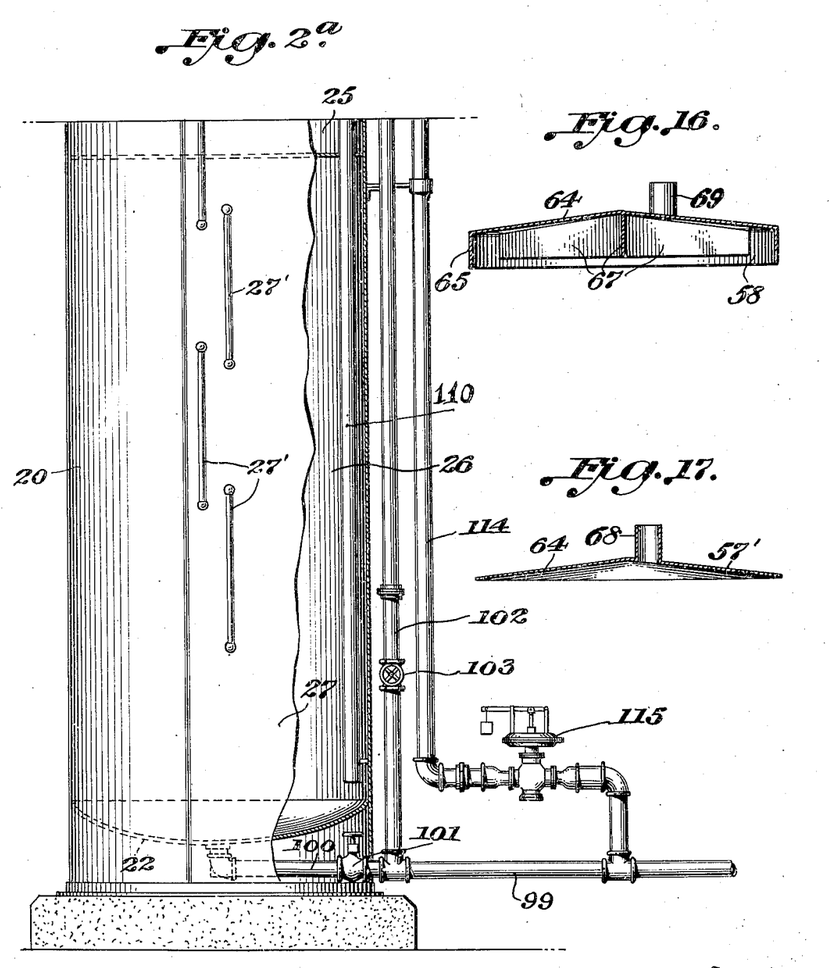
Figure 16 is a transverse section taken on line 16—16 of Figure 10.
Figure 17 is a central vertical section through the lowermost tray.
Figure 5:
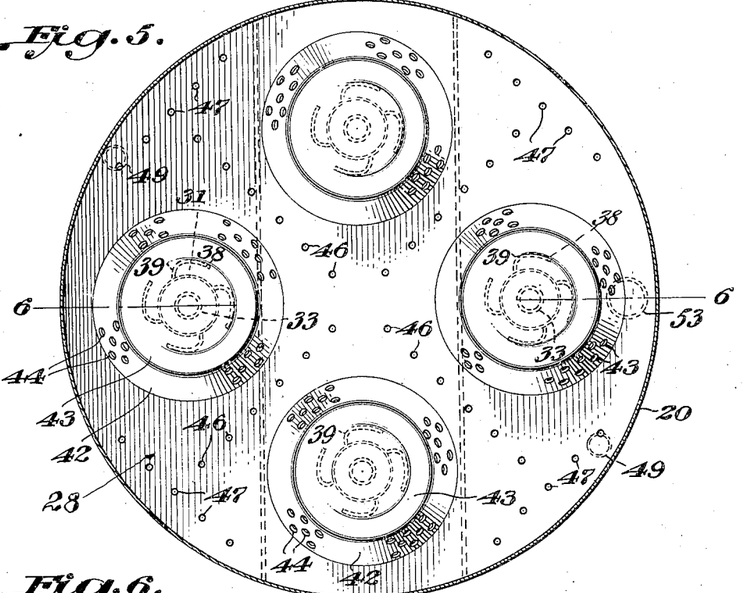
Figure 5 is a plan view of the gas treating devices.
Figure 6:
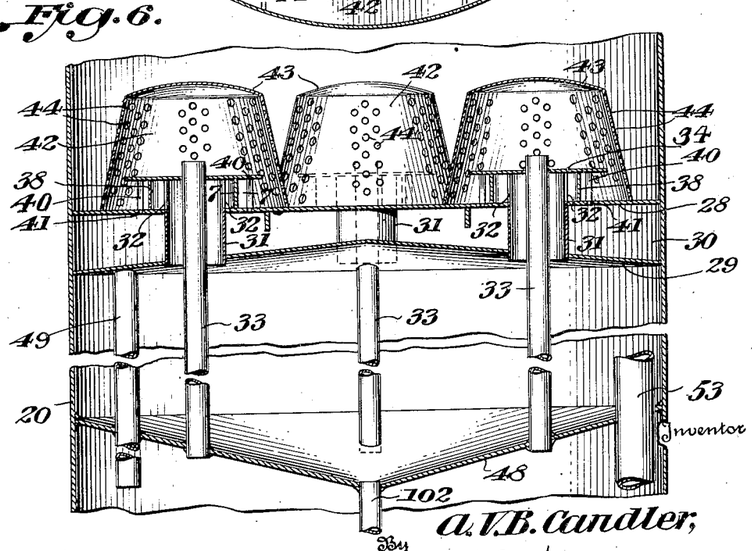
Figure 6 is a vertical section taken on line 6—6 of Figure 5.
Figures 7, 8, 8A, 9:
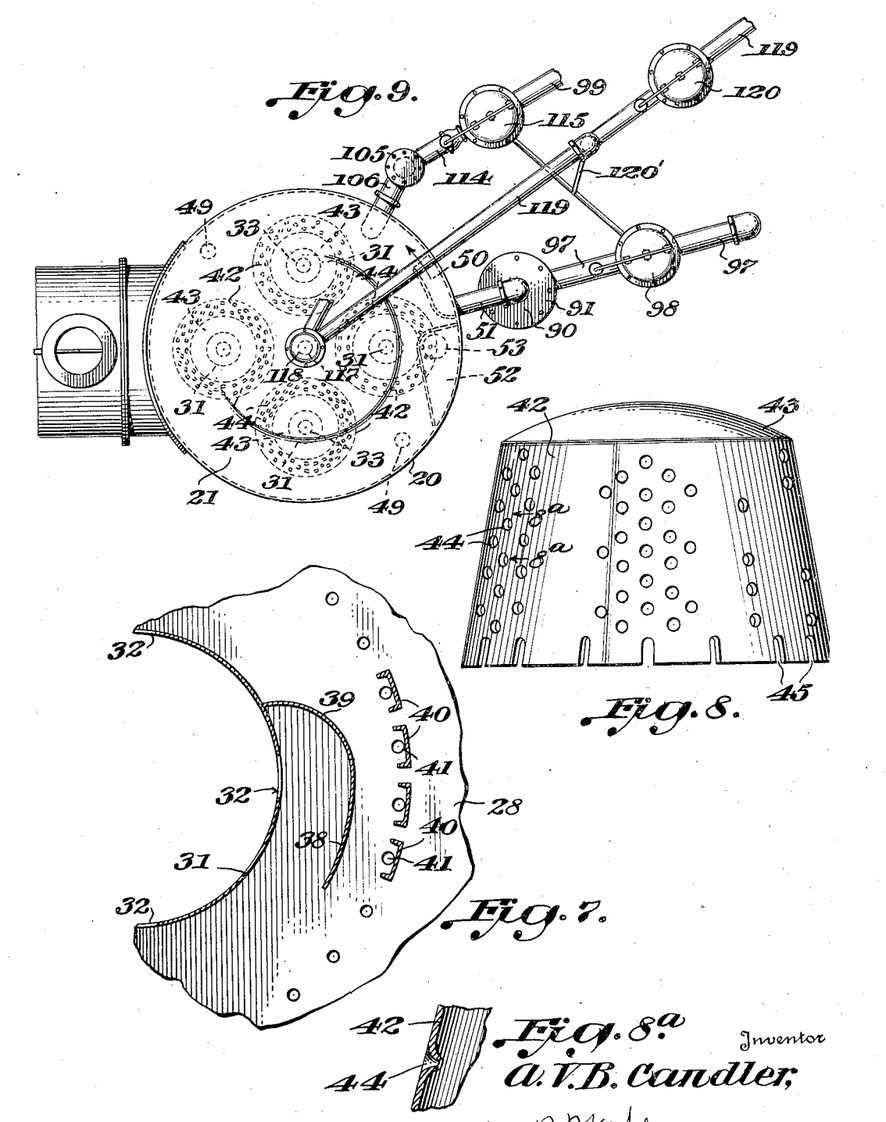
Figure 7 is an enlarged horizontal section taken on line 7—7 of Figure 6.
Figure 8 is a side elevation of one of the gas treating domes, Figure 8ª is a detailed section taken on line 8ª—8ª of Figure 8.
Figure 9 is a plan view of the apparatus.
Figure 10:
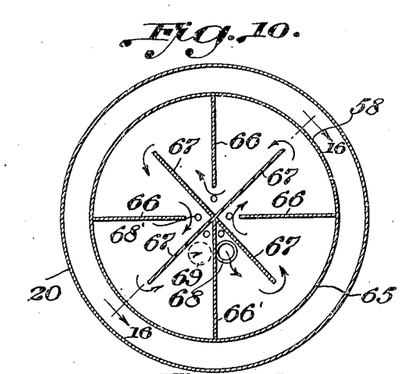
Figure 10 is a horizontal section taken on line 10—10 of Figure 1ª, looking down.
Figure 11:
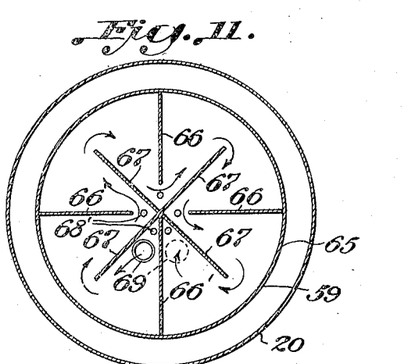
Figure 11 is a similar view through the next upper tray.
Figure 12:
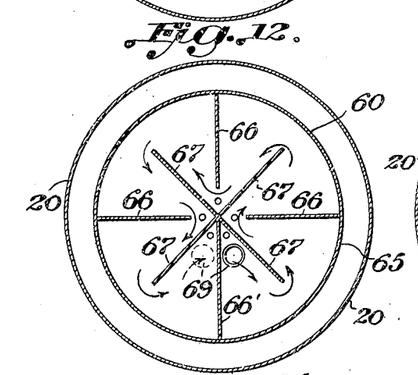
Figure 12 is a similar view through the next upper tray.
Figure 13:
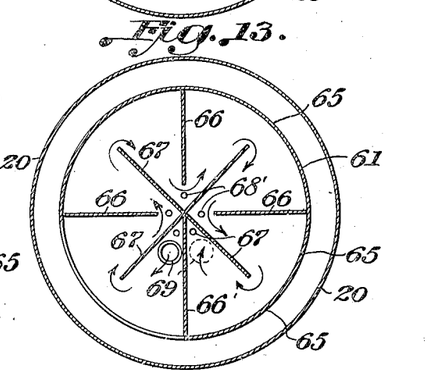
Figure 13 is a similar view through the next upper tray.
Figure 14:
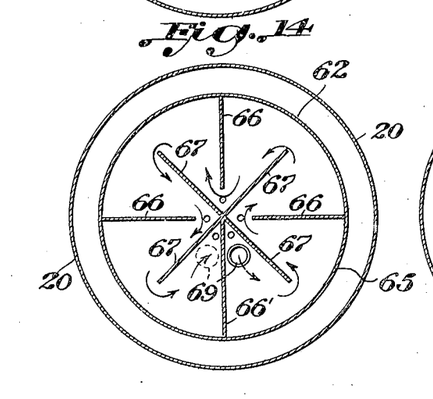
Figure 14 is a similar view through the next upper tray.
Figure 15:
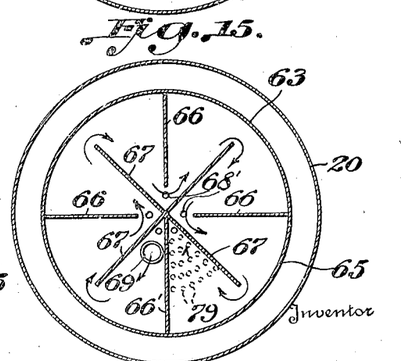
Figure 15 is a similar view through the next upper tray.
Figure 18:
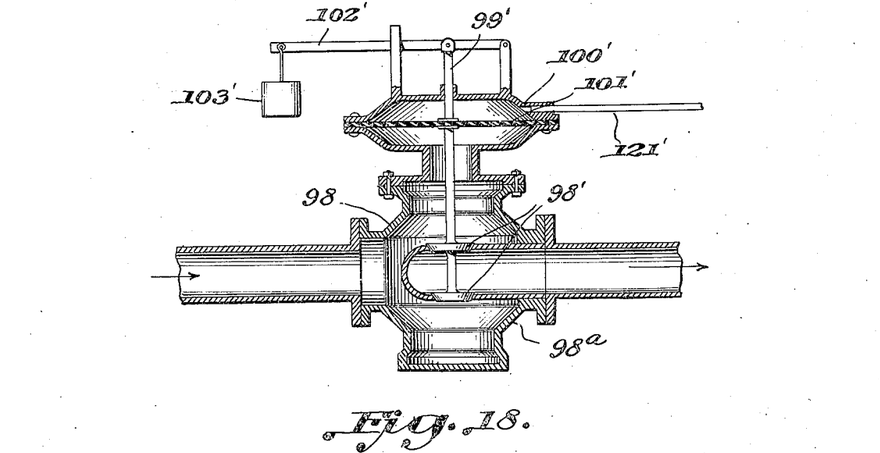
Figure 18 is a central vertical section through a differential pressure operated valve connected with the oil outlet pipe.
Figure 19:
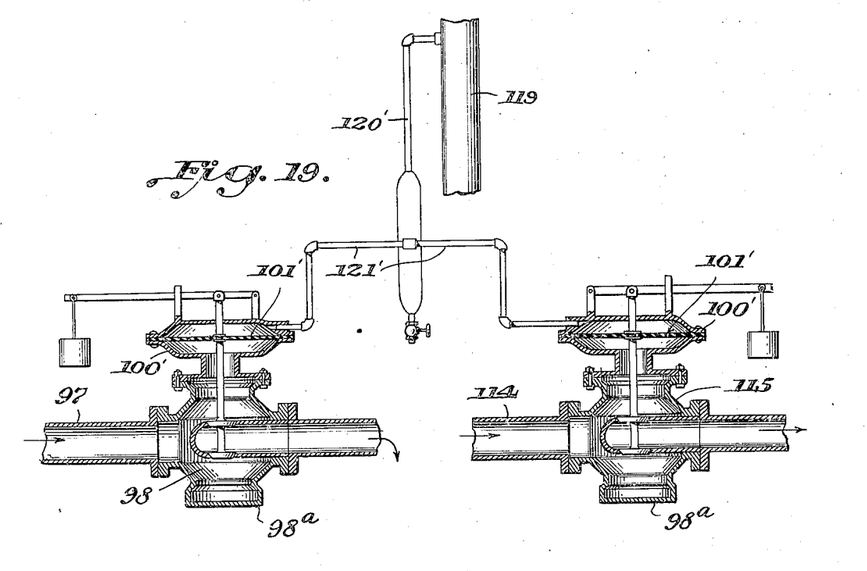
Figure 19 is a side elevation of the differential pressure operated valves connected with the oil outlet pipe and the water outlet pipe.

Arranged within the chamber 26 are spaced baffle trays 57', 58, 59, 60, 61, 62 and 63. These baffle trays are suitably supported within the chamber 26 by vertical bars 63' or the like. Each baffle tray has an imperforate top 64, which is preferably conical, decreasing in diameter upwardly. Each baffle tray 58 to 63 inclusive has a marginal cylindrical flange 65, extending from the top and depending beneath the lower edge of radial baffles therein, to be described. Arranged within each of the baffle trays 58 to 63 are outer radial baffles 66 and 66', the outer ends of which contact with the flange 65, while their inner ends are spaced. Inner radial baffles 67 are also disposed within each baffle tray 58 to 63, their inner ends meeting and their outer ends being spaced from the marginal flange 65. The inner end of the baffle 66' also meets the baffles 67. These baffles provide a tortuous passage, as shown. In order that gas may not accumulate within the baffle trays, the top of the baffle trays are provided with apertures 68', adjacent to the inner end of the baffle, as shown. The lowermost baffle trays 57' has an outlet pipe 68 which leads into the next lowermost tray 58 upon the right side of the adjacent baffle 66'. The baffle tray 58 has an outlet pipe 69, which leads into the next baffle tray 59, upon the left side of the baffle 66'. Each of the remaining baffle trays 59, 60, 61 and 62 is equipped with the same outlet pipe 69, which are disposed alternately upon opposite sides of the partition 66'. The uppermost baffle tray 63 does not have the pipe 69 but has a set of apertures 79, arranged opposite to and remote from the apertures 79' formed in the bottom 54 so that escaping gases being intercepted by plate 54 will have to travel the maximum distance, thereby reducing agitation of the liquid. In the baffle trays 58 to 63, the marginal flanges 65 extend downwardly below the baffles 66, 66' and 67, preferably for the same distance that the cone top 64 extends above such baffles, as more clearly shown in Figure 16.

The pipe 53 extends downwardly into the heating and bottom accumulator chamber 27, and is therein connected with a spreader including horizontal pipe 80, carrying spaced horizontal branch pipes 81. These branch pipes are apertured and have nozzles upon their top sides, for spraying the emulsion upwardly. The numeral 82 designates a heating element, preferably of the type using gas as a fuel. This heating element projects into the chamber 27, above the pipes 80 and 81, extending through a suitable opening 83. This heating element embodies an outer annular drum 84, formed in sections 84' and 85', and an inner hollow head or shell 85, connected with a casing 86, also formed in sections 86' and 87'. An annular set of tubes 87 surrounds the casing 86 in spaced relation and are connected with the head 85 and a plate 88', arranged between the flanges of the sections 84' and 85'. The numeral 88 designates a burner, using either gas or oil. The products of combustion escape through a flue 89.

The numeral 90 designates a heat exchanger for preheating the incoming emulsion. This heat exchanger includes an outer vertical casing 91 which is preferably cylindrical and extends longitudinally of the casing 20. The casing 91 is provided interiorly thereof with heads 92, spaced from the ends of the casing 91, and these heads are secured to open ended tubes 93, which communicate with the casing above and below the heads 92 but otherwise have no communication with the casing 91. The pipe 51 leads into the top of the casing 91 and an inlet pipe 94 leads into the bottom of the casing 91. Pipes 95 and 96 lead into the settling chamber 25. These pipes lead into the casing 91 exteriorly of the tubes 93. The pipe 95 determines the overflow level of the oil accumulated within the chamber 25 and the pipe 96 permits of the return of any gas which may accumulate in the casing 91 back into the chamber 25. A differential pressure control device is provided for the casing 91 including an oil outlet pipe 97 connected with the lower portion of the casing 91 above the lower head 92. A differential pressure operated valve 98 is connected into pipe 97. When the valve 98 opens the treated oil is withdrawn. This valve 98 includes a housing 98ª and valve elements 98', connected with a rod 99', which seats and unseats the valve elements. Arranged above the housing 98ª is a diaphragm housing 100', having a flexible diaphragm 101' therein. This diaphragm is connected with the rod 99', in turn connected with a lever 102', having a weight 103', adjustable thereon.

The numeral 99 designates a drain pipe having a branch 100, connected with the head 22 and leading into the bottom of the chamber 27. The pipe 100 is equipped with a cut-off valve 101. Connected with the drain pipe 99 is a branch pipe 102, equipped with a cut-off valve 103, connected with the bottom 48 and leading into the chamber 24. By opening the valve 101 the chambers 26 and 27 may be drained and by opening the valve 103 the chamber 24 may be drained.

Means are provided for maintaining a selected fixed level of salt water within the chambers 24 and 27, including the conventional syphon arrangement for water disposal in this connection. The apparatus includes a vertical pipe arm 104 connected with a syphon box 105 connected at its top with a pressure equalizer pipe 106 extending into the top of the chamber 23. Extending into the box 105 is a vertically adjustable tubular nipple 107 connected with the vertical pipe 108, having a cut-off valve 109 connected therewith. A vertical pipe arm 110 leads into the bottom of the chamber 27 and is connected with a syphon box 111, have a pressure equalizer pipe 112 connected therewith and leading into the top of the chamber 25. A vertically adjustable tubular nipple 113 extends into the box 111, the lower section of the tubular nipple telescoping with the vertical pipe 114. The marks "1," "2," "3" and "4" on the nipples 107 and 113 in the syphon boxes govern the depths of oil of an average specific gravity that can be carried on the salt water. For example, when the bottom edge of the flange on the lower section of the tubular nipple 107 is positioned so as to coincide with the mark "4" on vertical pipe 108, approximately four feet of 0.85 specific gravity oil is maintained on top of the salt water in the tank. The pipe 114 has a pressure operated valve 115 connected therein which is identical with the valve 98. The pipe 114 is connected with the drain pipe 99.

A gas outlet pipe 117 is connected with the top head 21 and has a pressure relief valve 118 connected therein. This is a safety valve and opens only at a pressure above the selected operating pressure to be carried. A pipe 119 is connected with the pipe 117 and has a back pressure regulator valve 120 connected therein. This regulator has a diaphragm element which opens and closes the valve in response to small variations in inlet pressure thereby automatically maintaining the selected operating pressure to be carried. Valve 120 is similar to valve 98.

A pipe 120' is connected in the pipe 119, and is connected with a branch pipe 121', which leads through a drip trap into the diaphragm housing 100' of the valves 98 and 115, above the diaphragms therein.

The operation of the apparatus is as follows:

The crude oil containing the emulsion, salt water and gas is fed continuously at the proper rate through the pipe 94 into the heat exchanger casing 91 and passes through the tubes 93 and then passes into the pipe 51. The emulsion circulates in the tubes 93 in a counterflow direction to the warm out-going oil which is travelling longitudinally within the casing 91 exteriorly of the tubes 93 toward the outlet pipe 97. This countercurrent flow of the emulsion and the treated oil produces efficient operation in that the incoming emulsion is preheated. This utilizes a portion of the heat load which would otherwise be dissipated, thereby requiring a proportionately less load on the heating element 82, to meet the thermal requirements of the scrubbing and washing unit, as well as stabilizing the out-going treated oil owing to reduction in temperature.

The emulsion discharged from the top of the heat exchanger 90 through the pipe 51 enters the knock-out chamber 24 through the diverting box or nozzle 50, and the stream of such emulsion is tangentially or circumferentially directed, and impinges upon the periphery of the knock-out chamber 24. The result of this circumvolution of the liquid in the knock-out chamber 24 tends to the separation of the free gas associated with the emulsion. When the knock-out chamber 24 is filled to the level of the receiver box 52, the level is maintained at the elevation of the receiver box, and the emulsion flows into the top of the receiver box and then into the down pipe 53. The free-water associated with the emulsion settles in the bottom of the knock-out chamber 24. The gas thus released rises through the tubes or cylinders 31. This gas passes radially through the openings 32 after contacting with and rubbing against the tube or cylinder 31 and then enters the wings 38 and contacts with and rubs against the same and travels longitudinally and circumferentially within these wings and then discharges into the space inwardly of the channels 40 and contacts with and rubs against these channels. The gas then passes between the channels and enters dome 42 and contacts with and rubs against the periphery of the dome having the apertured or punched and swaged periphery, and then discharges into the chamber 23 proper. This contacting and rubbing action separates the oil mist in the gas stream. The dry gas passes out through the gas outlet pipes 117 and 119. The heavier hydro-carbons or oil mist are now converted into a liquid form, and this liquid passes downwardly upon the bottom 28 and passes through the apertures 41, 46 and 47 and enters the sump chamber 30. This liquid passes from the sump chamber through the down pipes 49 and enters the settling chamber 25. The lower end of these drain pipes 49 form a liquid seal with the treated oil within the settling tank.

It will be noted that the plates 28 and 29 will have different temperatures. The lower conical plate 29 forming the bottom of the sump chamber being in contact with the warmer emulsion and vapors entering the knock-out chamber, will be considerably hotter than the top plate 28 which is in contact with the rising gases within the chamber 23, which tends to reduce its temperature. There is some vaporization or expansion of gases in the sump chamber 30 due to the heat from the bottom 29, and these expanding gases rise and contact with the upper wall 28 and thereby reduce its temperature. The sump chamber serves as an insulating means between the knockout chamber 24 and the separating chamber 23, since it affords a gas space, and this action of heat insulation is increased by the expanding action of the gas. The resultant temperature in the sump chamber will therefore be lower than the temperature in the knock-out chamber 24 and the sump chamber serves as a heat insulating section between the comparatively cool gas separating chamber 23 and the warm knock-out chamber 24. Due to the low temperature in the gas separating chamber 23 there is a tendency to condense the heavy hydro-carbon fractions as butanes, pentanes, and other heavier fractions which otherwise would not be recovered by the mechanical action of the gas separator.

The settling chamber 25 receives relatively hot oil, while the emulsion in the knock-out chamber 24 is relatively cool and cooler than the oil in the settling chamber. The warm vapors discharging from the top of the settling chamber 25 pass up through the tubes 33. Since these tubes are in thermal contact with the relatively cool emulsion in the knock-out chamber 24, heat exchange is effected between the warm vapors and the relatively cool emulsion and the temperature of the warm vapors is reduced before they enter the gas separating chamber 23 and the gas separating means. The relatively cool dry gas from the top of the knock-out chamber passes through the tubes 31 and enter the separating chamber 23 and separating means.

The preliminary separation of free-water in the emulsion is also effected in the knock-out chamber 24 and this free-water is syphoned out of the bottom of the knock-out chamber 24 by the syphon, thus regulating the level of the water. The emulsion separated from the free water floats upon the water and an upper layer of the emulsion is provided, having a level which is maintained constant by the emulsion continuously over-flowing into the receiver box 52. The emulsion entering the receiver box now passes through the down pipe 53. The emulsion flows by gravity through the down pipe 53 and is discharged at the lower end of the down pipe into the spreader which is located beneath the heating element. The gas associated with the emulsion in the knock-out chamber 24, which gas is not in solution or carried in suspension, passes through the tubes or cylinders 31, and enters the gas separating chamber 23. The liquid content is separated from the gas upon its passage through the separating chamber and the dry gas passes into the top of the chamber 23, as explained. The warm gaseous fluids released from the oil in the settling chamber 25 pass through the pipes 33 and enter the domes 42 and has contacting and rubbing action therewith. This tends to separate out the liquid content and the dry or stripped gas passes into the chamber 23. The spreader, including the apertured pipes 81 now receive the descending emulsion and serves to discharge or diffuse the emulsion over practically the entire cross-sectional area of the baffle trays. This emulsion is sprayed from the spreader in an upward direction and the warm emulsion rises and flows upwardly and around the heating element 82 and is further heated thereby. The flow of the emulsion through the apertures or nozzles of the pipes 81 is maintained constant by the static head created by the vertical distance between the receiver box 52 and the spreader. The emulsion therefore discharges from the spreader upwardly in a continuous manner and passes around the heating element. This emulsion has been substantially denuded of its free water in the upper knockout chamber 24. The heated emulsion passes upwardly above the heating element and is restricted in its upward passage upon entering the scrubbing and treating chamber 26, wherein it engages the scrubbing trays.

The upwardly travelling emulsion enters the bottom baffle tray 57' and passes from this bottom baffle tray to and through each succeeding upper baffle tray. In passing through each baffle tray, the velocity of the emulsion is reduced. The emulsion is caused to travel horizontally in a tortuous passage about the baffles in each baffle tray. The emulsion travels in opposite directions in each succeeding upper baffle tray. By this arrangement the horizontal and vertical travel of the emulsion is prolonged and this produces an optimum of scrubbing and washing effect. Any air which might be trapped within the trays may escape through the apertures 68', preventing gas or air locking. The fluid, owing to its slow passage through the arrangement of baffle trays, rises by thermo-action and the oil is released by gravitational separation, the result of heating and scrubbing contact that the emulsion had with the baffles and baffle trays. The mixture, in its circuitous upward travel, contacts with the lower faces of the baffle trays, marginal flanges and baffles, and the droplets of oil are slowly pushed along in the fluid stream while impinging against these surfaces. This scrubbing action opens the droplets, thereby separating the oil from the salt water and from any free salt or solids in suspension. In passing under the trays, the oil in the fluid stream being at the top and the salt water and heavier constituents at the bottom, these heavier constituents are drawn off under each baffle tray, such heavier constituents moving outwardly and downwardly beneath the marginal flange of each baffle tray and reflux from beneath the marginal flange. The salt water and heavy constituents upon passing outwardly beyond the flanges of the baffle trays, enter the vertical passage which surrounds these trays and travels downwardly in this passage by gravity and impinge upon the segmental partitions 55 and are deflected thereby into the open vertical passages 56. When passing downwardly through the passages 56 the aprons 57 tend to separate the downwardly moving salt water and the heavy constituents from the upwardly moving emulsion discharging from the spreader. The several baffle trays forming the baffle unit are so spaced that they provide side opening areas for effecting refluxing of the salt water and heavy constituents without the use of supplemental piping. The relationship of the baffle unit and the heating element is of prime consideration in that these two elements in conjunction with the arrangement of the passages formed by the segmental partitions 55 and aprons 57 provide a means that results in an extremely efficient circulating system, the salt water and heavy constituents reflux and flow radially outward beyond the marginal flanges of the baffle trays and then travel downwardly toward the bottom of the chamber 27. The salt water and heavy constituents travel downwardly thru the open passages 56 and are separated from the ascending emulsion by the aprons 57, the emulsion passing upwardly in the several trays, in succession. The level of the water in the chamber 27 is maintained constant by the adjustable syphon 111. This continuous recirculation through the salt water of the heavy constituents in the flow stream is most essential for complete separation and dehydration of the oil, breaking the emulsion, and the recirculation as described, is continuous within the chambers 26 and 27. The result of this action is practically complete separation of exceptionally tight emulsions without the application of a filter medium in any section of the apparatus.

The oil released from the mixture as it rises thru the trays, spreads out in a thin film under the trays, while the salt water and heavy constituents descend as a reflux. The scrubbing and washing action frees the oil of impurities and solids, such as salt particles held in suspension, and the clean flowing oil, after passing through the perforations 79 of the top tray, passes thru apertures 79', and travels thru the body of oil collected in the settling chamber 25. As the gas liberated from the oil on its passage in and from the baffle unit and thru the settling chamber tends to turbulence, for this reason the apertures 79' are arranged with respect to the apertures 79, to direct the oil cross-wise from the apertures 79 to the apertures 79' which causes further retardation of the flow of the oil in the settling chamber and prevention of undue ebullition as the gas and vapors rise thru the oil body in the settling chamber 25 to the gas chamber 23. As the level of the oil rises in the settling chamber 25, the treated oil passes thru the pipe 95 and enters the casing 91 of the heat exchanger. This heated oil passes downwardly thru the heat exchanger by gravity.

Any warm vapors released in the settling chamber 25 pass upwardly thru the equalizer pipes 33 and enter the gas separating chamber 23 wherein they are subject to the action of the gas separating domes 43. The oil mist is separated from the free gas and the vapors fed in thru the pipes 33 co-mingle with the gases fed in thru the tubes or cylinders 31.

Under operation a constant pressure is carried throughout the system while automatic discharge of both the oil and salt water pipes is governed by the differential control valves 98 and 115 respectively. The gas pressure is maintained constant and equal on the upper side of diaphragms 101', this pressure by equalization through pipes 120' being the same as the pressure in the system. The hydrostatic head of the liquid in the salt water disposal pipe 114 and in the annulus between the shell and tubes of the heat exchanger 91 acts upon the diaphragms 101' and unseats the valve elements in opposition to the action of the weight 103', and since the weight of the valve element including diaphragm, plate, stem and the force created by the constant gas pressure on top of the diaphragm are just counterbalanced by means of the weight and lever, the valve opens and closes responsive of the column of fluid in the draw-off lines independently of any change of pressure in the system or the head of fluid existing in the treater proper. It is preferred to operate the apparatus under a pressure of from ten to fifteen pounds per square inch, in which case the differential pressure controls are necessary.

In case it is desired to handle emulsions at or near atmospheric pressure, in order to take off the gas in the preliminary knock-out chamber 24 rather than to handle volatile gases in connection with gaseous fluids released upon heating under pressure, then the regulating pressure valves on the oil and salt water outlet or discharge pipes and on the gas disposal pipe can be omitted.

It is preferred to maintain the temperature within the chambers 26 and 27 to a degree sufficient to break the emulsion, but within limits not enough to cause excessive vaporization of the oil. An average temperature is about 140° F. although this may be varied as found advantageous. A self-acting temperature controller for automatically regulating the gas burner to maintain a constant predetermined temperature is employed for efficient operation. A thermometer, indicating pressure gauge and liquid level gauge glasses are also generally used.

It will be noted that the arrangement of piping throughout the apparatus provides for equalization of pressure throughout the system. The process of treating is continuous and automatic in all respects. My apparatus, as disclosed herein, has been found to have higher through-put or capacity rate with better treating results than treaters of similar size and type in operation in the oil fields.

In the practice of the method by this operation of the apparatus, the free water in the knockout chamber 24 has its level maintained constant at some point as indicated at A by means of adjustment of the nipple 107, while the level of the emulsion is maintained at the overflow point indicated at B. In the settling chamber 25 the level of the oil is indicated at C, the established overflow oil outlet.

The level of the water in the vertical column maintained in chambers 26 and 27 is indicated at D, the complete baffle tray assembly being submerged in water. Under this condition the oil section extends from level D to the overflow level at C, by means of adjustment of nipple 113 to the extreme low point at mark "4," and the oil accumulated on top of the water passes through apertures 79' in fluid interceptor plate 54.

It is to be understood that the form of my invention herewith shown and described is to be taken as a preferred example of the same and that various changes in the shape, size and arrangement of parts may be resorted to, without departing from the spirit of my invention or the scope of the subjoined claims.

Having thus described my invention, what I claim is:

1. Apparatus for treating petroleum emulsions comprising a vertical casing, means forming a gas separating chamber in the upper portion of the casing, a knock-out chamber in the casing exteriorly of, beneath and in end-to-end relation to the gas separating chamber, a sump chamber within the casing between the gas separating chamber and knock-out chamber and serving to heat insulate the separating chamber from the knock-out chamber, a settling chamber in the casing exteriorly of, beneath and in end-to-end relation to the knock-out chamber, a scrubbing and treating chamber in the casing exteriorly of, beneath and in end-to-end relation to the settling chamber, and a heating and bottom accumulator chamber in the casing beneath the scrubbing and treating chamber, tubes extending between the top of the knock-out chamber and the gas separating chamber, tubes extending between the top of the settling chamber and the gas separating chamber, gas treating devices arranged within the gas separating chamber and receiving the gas from the tubes to separate the gas from the liquid, tubes extending between the settling chamber and the sump chamber, the top of the sump chamber being perforated, a baffle unit arranged within the scrubbing and treating chamber, a heating device extending into the heating and bottom accumulator chamber, means to supply emulsions into the knock-out chamber in a direction circumferential of its periphery, and means to conduct the emulsion from the knock-out chamber to the heating and bottom accumulator chamber at a point beneath the heating device.

2. Apparatus for treating petroleum emulsions comprising a vertical casing including a gas separating chamber, a knock-out chamber arranged exteriorly of, beneath and in end-to-end relation to the gas separating chamber, a sump chamber between the gas separating chamber and knock-out chamber and serving to heat insulate the gas separating chamber from the knock-out chamber, said sump chamber having a perforated top, a settling chamber arranged exteriorly of, beneath and in end-to-end relation to the knock-out chamber and having a perforated bottom, a scrubbing and treating chamber arranged exteriorly of, beneath and in end-to-end relation to the settling chamber, and a heating and bottom accumulator chamber beneath the scrubbing and treating chamber and having communication therewith, tubes extending between the knock-out chamber and the gas separating chamber, tubes extending between the settling chamber and the gas separating chamber, gas treating devices within the gas separating chamber and receiving the gas from the two sets of tubes, tubes extending between the sump chamber and the settling chamber, a baffle unit arranged within the scrubbing and treating chamber, a heating device extending into the heating and bottom accumulator chamber, means to supply emulsions into the knock-out chamber, and overflow device arranged within the knock-out chamber to receive the emulsion therein and define the level of the emulsion and extending into the heating and bottom accumulator chamber to supply the emulsion therein, and an outlet device for the settling chamber to receive the oil and define the level thereof.

3. Apparatus for treating petroleum emulsions comprising a gas separating chamber, a knock-out chamber arranged exteriorly of, beneath and in end-to-end relation to the gas separating chamber, a sump chamber between the gas separating chamber and knock-out chamber and having a perforated top and serving to heat insulate the separating chamber from the knock-out chamber, a settling chamber arranged exteriorly of, beneath and in end-to-end relation to the knock-out chamber and having a perforated bottom, a scrubbing and treating chamber arranged exteriorly of, beneath and in end-to-end relation to the settling chamber, a heating and bottom accumulator chamber beneath the scrubbing and treating chamber and having communication therewith, tubes extending between the knock-out chamber and gas separating chamber, tubes extending between the settling chamber and the gas separating chamber, gas treating devices within the gas separating chamber and receiving the gas from the tubes, tubes extending between the sump chamber and the settling chamber, a baffle unit arranged within the scrubbing and treating chamber, a heating device for the heating and bottom accumulator chamber, an overflow pipe extending into the knock-out chamber to receive the emulsion therefrom and extending into the heating and bottom accumulator chamber, a spraying device arranged within the heating and bottom accumulator chamber and connected with the overflow pipe, means to supply emulsions into the knock-out chamber, an outlet device for the settling chamber, and an outlet device for the gas separating chamber.

4. Apparatus for treating petroleum emulsions comprising a gas separating chamber, a knock-out chamber arranged exteriorly of, beneath and in end-to-end relation to the gas separating chamber, a sump chamber between the gas separating chamber and knock-out chamber and having a perforated top, and serving to heat insulate the separating chamber from the knock-out chamber, a settling chamber arranged exteriorly of, beneath and in end-to-end relation to the knock-out chamber, a scrubbing and treating device, tubes extending between the knock-out chamber and gas separating chamber, tubes extending between the settling chamber and gas separating chamber, gas treating devices within the gas separating chamber and receiving the gas from the tubes, tubes extending between the sump chamber and the settling chamber, a heat exchanger connected with the knock-out chamber to supply the emulsion to the same and connected with the settling chamber to receive the discharging heated oil, the heat exchanger preheating the incoming emulsion, means receiving the emulsion from the knock-out chamber and supplying the same to the scrubbing and treating device, the scrubbing and treating device having communication with the settling chamber, and means to heat the emulsion supplied to the scrubbing and treating device.

5. Apparatus for treating petroleum emulsions comprising a generally vertical casing, generally horizontal segmental partitions arranged within the casing for defining upper and lower chambers, the segmental partitions being circumferentially spaced to provide vertical passages, aprons arranged between and depending below the segmental partitions and spaced from side to side of the casing, a baffle unit arranged within the upper chamber and spaced from the side of the casing, a heating element arranged within the lower chamber between the aprons, means arranged within the lower chamber beneath the heating element for spraying an emulsion into the lower chamber, means for withdrawing the separated water from the casing, and means receiving the treated oil from the upper portion of the upper chamber.

6. Apparatus for treating petroleum emulsions comprising a casing, generally horizontal partitions arranged within the casing for defining upper and lower chambers, the partitions being circumferentially spaced to provide side vertical passages, the partitions extending inwardly from the casing defining an inner vertical passage, aprons arranged between the generally horizontal partitions and extending below the same and spaced from side to side of the casing, a plurality of spaced superposed baffle trays arranged within the upper chamber above the partitions and covering the inner vertical passage and spaced from the side of the casing, a heating element arranged within the lower chamber between the aprons, means for supplying an emulsion into the lower chamber, means for withdrawing the separated water from the casing and means receiving the treated oil from the upper chamber.

7. Apparatus for treating petroleum emulsions comprising an upstanding casing, generally horizontal segmental partitions arranged within the casing for defining upper and lower chambers, the segmental partitions being circumferentially spaced to provide vertical side passages and extending inwardly from the casing for forming an inner vertical passage, aprons arranged between the segmental partitions and spaced from the side of the casing, a baffle unit arranged within the upper chamber, means for heating the lower chamber, means for supplying an emulsion into the lower chamber, means to withdraw the separated water from the casing, and means for receiving the treated oil from the upper chamber.

8. Apparatus for treating petroleum emulsions comprising a casing, generally horizontal partitions arranged within the casing for defining upper and lower chambers, the partitions extending inwardly from the casing for forming an inner vertical passage and being circumferentially spaced to provide vertical side passages, aprons arranged between the generally horizontal partitions and spaced from the sides of the casing, a plurality of spaced superposed baffle trays arranged within the upper chamber above the partitions and covering the inner vertical passage and spaced from the side of the casing for providing an outer vertical passage, each baffle tray having a marginal flange and radial baffles forming a tortuous passage, each tray excepting the uppermost tray having an outlet pipe extending into the next upper tray, the uppermost tray having outlet means, means to heat the lower chamber, means for supplying an emulsion into the lower chamber, means to withdraw the separated water from the casing and means for receiving the treated oil from the upper chamber.

9. Apparatus for treating petroleum emulsions comprising a knock-out chamber, means for introducing petroleum emulsions into the knock-out chamber and imparting thereto a rotary motion for separating out the free gas and water, a gas separating chamber arranged exteriorly of the knock-out chamber, gas separating means arranged within the gas separating chamber to separate the gas from the liquid, means for supplying gas from the knock-out chamber to the gas separating chamber, a settling chamber arranged exteriorly of the knock-out chamber and the separating chamber, means for receiving the recovered liquid from the gas separating chamber and supplying the same to the settling chamber, an emulsion treating chamber, means receiving the emulsion from the knock-out chamber and supplying the same to the lower portion of the treating chamber, means to heat the lower portion of the treating chamber, a plurality of baffles in the treating chamber, the settling chamber receiving the oil from the treating chamber, oil outlet means for the settling chamber, and gas outlet means for the gas separating chamber.

10. Apparatus for treating petroleum emulsions comprising a knock-out chamber, means for introducing petroleum emulsions into the knock-out chamber and imparting thereto a rotary motion for separating out the free gas and water, means for maintaining a desired water level within the knock-out chamber so that the emulsion floats upon the water, gas separating means arranged exteriorly of the knock-out chamber for receiving gas from the knock-out chamber for separating the gas and liquid, a settling chamber arranged exteriorly of the knock-out chamber, means for supplying gas from the settling chamber to the gas separating means, means for conducting the separated liquid from the gas separating means into the settling chamber, an emulsion treating chamber for holding water arranged exteriorly of the settling chamber and having near its top restricted communication with the settling chamber, means receiving the emulsion from the knock-out chamber and supplying the same into the lower portion of the treating chamber beneath the level of the water, means for maintaining a desired water level in the treating chamber, a heating element extending into the treating chamber, baffles in the treating chamber, means to withdraw the oil from the settling chamber, and gas outlet means for the gas separating means.

11. Apparatus for treating petroleum emulsions, comprising a gas separating chamber having a bottom, an upstanding tube extending thru the bottom and projecting above the same and provided above the bottom in its periphery with openings, circumferentially extending vanes spaced from and blocking the openings, a substantially annular set of spaced upstanding channels surrounding the vanes, the passages of the channels facing inwardly, the said bottom of the chamber having apertures leading into the passages of the channels, a plate covering the top of the tube, vanes, and channels, a chamber arranged beneath and next to the apertured bottom to receive the recovered liquid, and means to supply the gas to the tube.

12. Apparatus for treating petroleum emulsions, comprising a gas separating chamber having a bottom and gas treating devices, a sump chamber arranged beneath the bottom, a knock-out chamber beneath the sump chamber, a settling chamber beneath the knock-out chamber, tubes passing thru the sump chamber and having their lower ends leading into the knock-out chamber and their upper ends projecting above said bottom of the gas separating chamber, tubes leading into the upper end of the settling chamber and being smaller than and passing thru the first named tubes and discharging into the gas treating devices in the gas separating chamber, each gas treating device receiving the gas from a set of large and small tubes, tubes leading into the sump chamber and discharging into the lower portion of the settling chamber, and means for withdrawing the emulsion from the knock-out chamber.

13. Apparatus for treating petroleum emusions, comprising a gas separating chamber having an apertured bottom, a sump chamber arranged beneath the apertured bottom, large tubes extending thru the sump chamber and projecting above the apertured bottom and having their upper ends provided with openings in their periphery, circumferentially extending vanes spaced from and blocking the openings of each tube, a horizontal plate covering the upper end of each tube and its vanes and having a central opening, an inner tube extending thru each large tube and the central opening and discharging into the gas separating chamber, a dome covering each large tube, inner tube and associated vanes, said dome having its periphery apertured, means for supplying gas to each large tube separate means to supply gas to each inner tube, and means to withdraw the oil from the sump chamber.

14. Apparatus for treating petroleum emulsions, comprising an upstanding casing, generally horizontal partitions arranged within the casing and circumferentially spaced for forming vertical side passages, the partitions extending inwardly from the casing for forming a vertical central passage, vertical aprons arranged between the partitions and spaced from the side of the casing, a heating element arranged within the casing below the partitions, a spreader arranged within the casing beneath the heating element, means to supply an emulsion to the spreader, a plurality of spaced superposed trays arranged within the casing above the partition and spaced from the side of the casing for providing an outer vertical passage, means to withdraw the recovered oil from the upper portion of the casing, and means to withdraw the separated water from the casing.

15. Apparatus for treating petroleum emulsions, comprising an upstanding casing, generally horizontal partitions arranged within the casing and having their outer edges adjacent to the side of the casing, the partitions being circumferentially spaced for forming side passages and extending inwardly from the casing for forming an inner passage, generally vertical aprons arranged between the partitions and spaced from the side of the casing and terminating at their upper ends generally at the elevation of the partitions and extending downwardly below the partitions, a heating element within the casing below the partitions, means for supplying the petroleum emulsion to the casing beneath the partitions, a plurality of spaced superposed trays within the casing above the partitions and spaced from the side of the casing, means to withdraw the recovered oil from the casing, and means to remove the separated water from the casing.

16. Apparatus for treating petroleum emulsions, comprising an upstanding casing, generally horizontal partitions arranged within the casing and having their outer edges adjacent to the side of the casing, the partitions being circumferentially spaced for providing side passages and expending inwardly from the casing for forming an inner passage, generally vertical aprons arranged between the partitions and spaced from the side of the casing and terminating at their upper ends near the partitions and extending downwardly below the partitions, means to heat the casing below the partitions, means for supplying the petroleum emulsion to the casing beneath the partitions, a plurality of spaced superposed baffle trays within the casing above the partitions and covering the inner passage and spaced from the side of the casing, each baffle tray having a depending marginal flange, means to withdraw the recovered oil from the casing, and means to remove the separated water from the casing.

17. Apparatus for treating petroleum emulsions, comprising a casing, a plurality of space superposed baffle trays arranged within the casing and spaced from the side thereof, each baffle tray having a depending marginal flange, each baffle tray having inner radial baffles having their outer ends spaced from the marginal flange, and outer short and long radial baffles alternately arranged with respect to the inner baffles, the outer short baffles having their outer ends adjacent to the marginal flange and their inner ends spaced from the inner ends of the inner baffles, the long baffle having its outer end adjacent to the marginal flange and its inner end leading to the inner ends of the inner baffles, each tray excepting the uppermost tray having an outlet pipe, the outlet pipe of one tray extending into the next upper tray, the outlet pipe of one tray being disposed upon one side of the long baffle and the outlet pipe of the next tray being disposed upon the opposite side of the long baffle, the uppermost tray having outlet means, means to heat the lower portion of the casing, means for supplying an emulsion into the lower portion of the casing, means for receiving the treated oil from the casing, and means to withdraw the separated water from the casing.

18. Apparatus for treating petroleum emulsions, comprising a knock-out chamber receiving the relatively cool emulsion, means leading into the knock-out chamber below the level of the emulsion therein for supplying the emulsion into the knock-out chamber and imparting thereto a rotary motion, a separate gas separating chamber arranged above the knock-out chamber, a sump chamber arranged between the gas separating chamber and the knock-out chamber and serving as heat insulating means between the knock-out chamber and gas separating chamber, the sump chamber having an apertured top, a settling chamber arranged beneath the knock-out chamber for receiving relatively hot oil, an emulsion treating unit for heating the emulsion and supplying the separated relatively hot oil to the lower portion of the settling chamber, means for withdrawing the emulsion from the upper portion of the knock-out chamber and supplying the emulsion to the emulsion treating unit, gas separating means arranged within the gas separating chamber, tubes arranged between the knock-out chamber and gas separating chamber and having their lower ends terminating near the top of the knock-out chamber and their upper ends leading into the gas separating means, said tubes supplying the relatively cool gas from the upper end of the knock-out chamber to the gas separating means, a second set of tubes extending through the knock-out chamber in thermal contact with the emulsion therein and having their lower ends leading into the settling chamber and terminating near the top of the settling chamber and their upper ends leading into the gas separating chamber and discharging into the gas separating means, the second set of tubes effecting heat exchange between the relatively warm vapor from the top of the settling chamber and the relatively cool emulsion within the knock-out chamber so that the temperature of such vapors are reduced before entering the gas separating means, and means receiving oil from the sump chamber and returning the same to the lower portion of the settling chamber, the last named means forming a seal with the oil within the settling chamber.

ARTHUR V. B. CANDLER.

REFERENCES CITED

The following references are of record in the file of this patent:

UNITED STATES PATENTS

| Number | Name | Date |
| --- | --- | --- |
| 970,477 | Dunn | Sept. 20, 1910 |
| 1,846,248 | Clarke | Feb. 23, 1932 |
| 1,970,783 | Walker | Aug. 21, 1934 |
| 1,999,950 | Waters | Apr. 30, 1935 |
| 2,037,426 | McKeever | Apr. 14, 1936 |
| 2,167,160 | Raymond | July 25, 1939 |
| 2,179,131 | Millard | Nov. 7, 1939 |
| 2,181,685 | Walker | Nov. 28, 1939 |
| 2,232,948 | Ihrig | Feb. 25, 1941 |
| 2,256,524 | McKelvey | Sept. 23, 1941 |
| 2,261,101 | Erwin | Oct. 28, 1941 |
| 2,288,245 | Kopp | June 30, 1942 |
| 2,297,297 | Walker | Sept. 29, 1942 |
| 2,266,302 | Welch | Jan. 2, 1945 |